US012356136B2

(12) United States Patent
Xue et al.

(10) Patent No.: US 12,356,136 B2
(45) Date of Patent: Jul. 8, 2025

(54) VEHICLE-MOUNTED WOOFER DEVICE AND DESIGN METHOD THEREFOR

(71) Applicant: SUZHOU SONAVOX ELECTRONICS CO., LTD., Jiangsu (CN)

(72) Inventors: Xiafeng Xue, Jiangsu (CN); Guoqiang Chai, Jiangsu (CN)

(73) Assignee: SUZHOU SONAVOX ELECTRONICS CO., LTD., Jiangsu (CN)

( * ) Notice: Subject to any disclaimer, the term of this patent is extended or adjusted under 35 U.S.C. 154(b) by 357 days.

(21) Appl. No.: 18/040,784

(22) PCT Filed: Jul. 5, 2021

(86) PCT No.: PCT/CN2021/104528
§ 371 (c)(1),
(2) Date: Feb. 6, 2023

(87) PCT Pub. No.: WO2022/033235
PCT Pub. Date: Feb. 17, 2022

(65) Prior Publication Data

US 2024/0031731 A1 Jan. 25, 2024

(30) Foreign Application Priority Data

Aug. 10, 2020 (CN) ......................... 202010794316.8

(51) Int. Cl.
*H04R 1/20* (2006.01)
*H04R 1/02* (2006.01)

(52) U.S. Cl.
CPC ............... *H04R 1/20* (2013.01); *H04R 1/025* (2013.01); *H04R 2499/13* (2013.01)

(58) Field of Classification Search
CPC ....... H04R 1/20; H04R 1/025; H04R 2499/13
(Continued)

(56) References Cited

U.S. PATENT DOCUMENTS 5,218,175 A * 6/1993 Scarlata ............... H04R 1/2857 181/150
5,513,270 A * 4/1996 Lewis .................. H04R 1/2826 381/338
(Continued)

FOREIGN PATENT DOCUMENTS

CN 1119019 C 8/2003
CN 106528907 A 3/2017
(Continued)

OTHER PUBLICATIONS

International Search Report and Written Opinion issued for International Patent Application No. PCT/CN2021/104528, dated Oct. 8, 2021 in 10 pages.

*Primary Examiner* — Sean H Nguyen
(74) *Attorney, Agent, or Firm* — Knobbe, Martens, Olson & Bear, LLP

(57) ABSTRACT

The present disclosure relates to a vehicle-mounted woofer device and a design method therefor. The vehicle-mounted woofer device comprises a box body and a woofer disposed in the box body. The woofer comprises a cone. The cone has a front surface facing the interior of a cabin and a rear surface opposite to the front surface. A cavity is formed between the rear surface of the cone and the box body. A main waveguide for communicating the cavity with the outside is disposed in the box body. A secondary waveguide is further disposed in the box body. The main waveguide and the secondary waveguide are each provided with an inlet in communication with the cavity. The main waveguide is provided with an outlet for communicating with the outside of the cabin, and the secondary waveguide is provided with an outlet for communicating with the outside or inside of the cabin. The woofer device of the present disclosure has high sensitivity and relatively obvious low-frequency expansion, and improves the sound pressure level at low frequencies.
(Continued)

According to the design method of the present disclosure, more parameters can be adjusted and controlled, and the degree of freedom is greater.

17 Claims, 6 Drawing Sheets

(58) Field of Classification Search
USPC .......................................................... 381/86
See application file for complete search history.

(56) References Cited

U.S. PATENT DOCUMENTS

| | | | | |
|---|---|---|---|---|
| 9,591,388 | B2 * | 3/2017 | Tanabe | H04R 7/00 |
| 10,000,162 | B2 * | 6/2018 | Kim | H04R 1/025 |
| 11,917,388 | B2 * | 2/2024 | Tabata | H04R 9/043 |
| 2013/0083937 | A1 * | 4/2013 | Arai | H04R 1/2819<br>381/349 |
| 2013/0188806 | A1 * | 7/2013 | Tada | B60R 11/0217<br>381/86 |

FOREIGN PATENT DOCUMENTS

| | | | |
|---|---|---|---|
| CN | 111836157 | A | 10/2020 |
| CN | 212435915 | U | 1/2021 |
| EP | 2603017 | A2 | 6/2013 |
| WO | WO 2011/052080 | A1 | 5/2011 |

* cited by examiner

VEHICLE-MOUNTED WOOFER DEVICE AND DESIGN METHOD THEREFOR

RELATED APPLICATION(S)

This application is the U.S. National Phase under 35. U.S.C. § 371 of International Application PCT/CN2021/104528, filed Jul. 5, 2021, which claims priority to Chinese Patent Application No. CN2020107943168 filed on Aug. 10, 2020. The disclosures of the above-described applications are hereby incorporated by reference in their entirety.

FIELD OF TECHNOLOGY

The present disclosure belongs to the field of vehicle-mounted loudspeakers, and relates to a vehicle-mounted woofer device and a design method therefor.

BACKGROUND

For high-quality automobile audio systems, the woofer is especially important, and a ventilated loudspeaker is a type of woofer unit. The vehicle-mounted ventilated loudspeaker mainly guides the rearward radiated energy of the loudspeaker into the automobile compartment through a tube, the tube and the rear cavity of the loudspeaker acts as a Helmholtz resonator, and the low-frequency resonance frequency and high-frequency cut-off frequency of the woofer device can be adjusted by adjusting the size of the rear cavity and the length or thickness of the tube. However, due to the very complex structure of the automobile, it is sometimes difficult to adjust the sound pressure output in the tube, and the sensitivity of the loudspeaker needs to be further improved.

SUMMARY

An aspect relates to a woofer device, which has high sensitivity and relatively obvious low-frequency expansion, and improves the sound pressure level at low frequencies.

Another aspect relates to a design method for a vehicle-mounted woofer device, which has more parameters that can be adjusted and controlled, and has greater degree of freedom.

One aspect of the present disclosure provides a vehicle-mounted woofer device, comprising a box body and a woofer disposed in the box body, wherein the woofer comprises a cone, the cone has a front surface facing the interior of a automobile compartment and a rear surface opposite to the front surface, a cavity is formed between the rear surface of the cone and the box body, a main waveguide tube for communicating the cavity with the outside is disposed in the box body, a secondary waveguide tube is further disposed in the box body, the main waveguide tube and the secondary waveguide tube are each provided with an inlet in communication with the cavity, the main waveguide tube is provided with an outlet for communicating with the outside of the automobile compartment, and the secondary waveguide tube is provided with an outlet for communicating with the outside or inside of the automobile compartment.

In an embodiment, the cone is arranged on a frame, the frame is connected to a front end of the box body, a rear cover is arranged on a rear end of the box body, and the respective outlets are arranged on the rear cover.

In an embodiment, a first partition plate is arranged in the box body, and the first partition plate is located between the woofer and the rear cover to form the cavity on the front side of the first baffle, the main waveguide tube and the secondary waveguide tube are formed between the first partition plate and the rear cover, and the respective inlets are opened on the first partition plate.

In an embodiment, a second partition plate, a third partition plate and a fourth partition plate are further arranged in the box body, and the second partition plate divides a space between the first partition plate and the rear cover into a first space portion and a second space portion, the third partition plate divides the first space portion to form the main waveguide tube, and the fourth partition plate divides the second space portion to form the secondary waveguide tube.

In an embodiment, both the third partition plate and the fourth partition plate are curved plate in arc shape, and the two arc shapes share a same center of circle, and radius of the third partition plate is smaller than that of the fourth partition plate.

In an embodiment, a head end of the third partition plate and a head end of the fourth partition plate are respectively connected to the second partition plate, and gaps that are in communication with corresponding outlets of the waveguide tubes are respectively formed between a tail end of the third partition plate and the second partition plate and between a tail end of the fourth partition plate and the second partition plate.

In an embodiment, the head end of the fourth partition plate is adjacent to the tail end of the third partition plate.

In an embodiment, the inlet of the main waveguide tube is adjacent to the head end of the third partition plate, and the inlet of the secondary waveguide tube is adjacent to the head end of the fourth partition plate.

In an embodiment, an outlet pipe portion extending rearward is formed in a middle portion of the rear cover, and the outlet pipe portion is divided by the second partition plate to form the outlet of the main waveguide tube and the outlet of the secondary waveguide tube.

In an embodiment, a second partition plate and a third partition plate are further arranged in the box body, and the second partition plate divides a space between the first partition plate and the rear cover into a first space portion and a second space portion, the third partition plate divides the first space portion to form the main waveguide tube or divides the second space portion to form the secondary waveguide tube.

In an embodiment, cross-section areas of the main waveguide tube and the secondary waveguide tube perpendicular to an airflow direction first decrease and then increase.

In an embodiment, a magnetic circuit system of the woofer is mounted on front side of the cone, a rear end of the voice coil of the woofer is connected to the cone, and a front end of the voice coil is inserted into a magnetic gap formed in the magnetic circuit system.

In an embodiment, the magnetic circuit system is mounted on the frame through the brace, and the brace is provided with a through hole for air to pass through.

In an embodiment, the woofer further comprises a damper, the damper is fixedly arranged at the rear end portion of the voice coil, the damper is located on the rear side of the cone, the outer periphery of the damper is mounted on the frame through a brace, and the brace is provided with a through hole for the air to pass through.

In an embodiment, the cone is a paper cone.

Another aspect of the present disclosure provides a design method for the above-mentioned vehicle-mounted woofer device, and the design method comprises the following steps:

S1, selecting a main waveguide tube and a secondary waveguide tube, and calculating the total radiation impedance of the selected main waveguide tube and the secondary waveguide tube;

S2, building a woofer device model according to the radiation impedances of the main waveguide tube and the secondary waveguide tube obtained in step S 1, and the model is shown in the following differential equations, $$\begin{cases} U(t) = R_e i(t) + L_e \frac{di}{dt} + Bl \cdot v(t) \\ Bl \cdot i(t) = M_{ms}\ddot{X}(t) + R_{ms}\dot{X}(t) + K_{ms}X(t) \end{cases}$$

wherein, U(t) is the voltage output by the front-end power amplifier of the woofer, $R_e$ is the DC resistance of the voice coil, i(t) is the current in the voice coil, $L_e$ is the inductance of the voice coil, Bl is the electromagnetic induction coefficient, and v(t) is the motion velocity of the voice coil, $M_{ms}$ is the vibration mass of a vibration system of the loudspeaker, $R_{ms}$ is the vibration resistance of the vibration system, $K_{ms}$ is the stiffness coefficient of the vibration system, $\ddot{X}(t)$ is the relationship of the vibration acceleration of the vibration system with time, $\dot{X}(t)$ is the relationship of the vibration velocity of the vibration system with time, X(t) is the relationship of the vibration displacement of the vibration system with time, and t is time;

S3, calculating the radiated sound field of the woofer device according to the model built in step S2;

S4, comparing the radiated sound field obtained in step S3 with a desired radiated sound field, if the desired radiated sound field is met, determining that the main waveguide tube and the secondary waveguide tube meet the design requirements; if the desired radiated sound field is not met, adjusting the configurations of the main waveguide tube and the secondary waveguide tube.

In one embodiment, step S1 specifically comprises steps: S11, calculating the radiation impedance of the main waveguide tube, S12, calculating the radiation impedance of the secondary waveguide tube, and S13, calculating the total radiation impedance of the main waveguide tube and the secondary waveguide tube.

Step S11 specifically comprises:

S111, calculating the radiation impedance $Z_{ar}$ of the opening at the end of the main waveguide tube, the cross-sectional area of the end of the main waveguide tube is $S_{aL}$, the radius is a, and the radiation impedance of the opening $Z_{ar}$ is as follows:

$$Z_{ar}=R_{ar}+j\omega M_{ar}$$

wherein, the acoustic radiation resistance $R_{ar}$ is as follows, $$R_{ar} = \frac{\rho_0 c_0 k}{2\pi} S_{aL}$$

the acoustic radiation reactance $M_{ar}$ is as follows, $$M_{ar} = \frac{8}{3\pi}\rho_0 a$$

and, j is the imaginary unit, ω is the angular frequency, $\rho_0$ is the density of the medium in which the sound wave propagates, $c_0$ is the speed of the sound wave propagating in the air, and k is the wave number, specifically defined as $k=\omega/c_0$;

S112, calculating the distributed impedance of the main waveguide tube: dividing the main waveguide tube into n sections according to the curvature change of the main waveguide tube, each section is a cylinder, and the radiation inductance $\Delta L_i$ and radiation resistance $\Delta C_i$ of the i-th section of the waveguide tube with a cross-sectional area of $S_i$ and a length of $\Delta l_i$ are respectively shown in the following equations, $$\Delta L_i = \frac{S_i}{\rho_0 c_0^2}\Delta l_i$$

$$\Delta C_i = \frac{\rho_0}{S_i}\Delta l_i$$

wherein, $1 \le i \le n$;

S113, obtaining the total radiation impedance of the main waveguide tube through stepping algorithm, calculating the total impedance $Z_n$ of the n-th section of the waveguide tube and the radiation of the opening, $$Z_n = \frac{R_{ar}}{R_{ar} + 1 + j\omega(\Delta C_{n1} + M_{ar}R_{ar})}$$

calculating the total impedance $Z_{n-1}$ between the n−1-th section of the waveguide tube and $Z_n$, $$Z_{n-1} = \frac{1}{1 + j\omega\Delta C_{n-1}Z_n} + j\omega\Delta L_{n-1}$$

by analogy, the total radiation impedance $Z_{a0}$ of the main waveguide tube and radiation opening is $$Z_{a0} = Z_1 = \frac{1}{1 + j\omega\Delta C_1 Z_2} + j\omega\Delta L_1.$$

Step S12 specifically comprises:

S121, calculating the radiation impedance $Z_{br}$ of the opening at the end of the secondary waveguide tube, the cross-sectional area of the end of the secondary waveguide tube is $S_{bL}$, the radius is b, and the radiation impedance of the opening $Z_{br}$ is as follows:

$$Z_{br}=R_{br}+j\omega M_{br}$$

wherein, the acoustic radiation resistance $R_{br}$ is as follows, $$R_{br} = \frac{\rho_0 c_0 k}{2\pi} S_{bL}$$

the acoustic radiation reactance $M_{ar}$ is as follows, $$M_{br}=\frac{8}{3\pi}\rho_0 b$$

and, j is the imaginary unit, ω is the angular frequency, $\rho_0$ is the density of the medium in which the sound wave propagates, $c_0$ is the speed of the sound wave propagating in the air, and k is the wave number, specifically defined as $k=\omega/c_0$;

S122, calculating the distributed impedance of the secondary waveguide tube: dividing the secondary waveguide tube into n sections according to the curvature change of the secondary waveguide tube, each section is a cylinder, and the radiation inductance $\Delta L_i$ and radiation reactance $\Delta C_i$ of the i-th section of the waveguide tube with a cross-sectional area of $S_i$ and a length of $\Delta l_i$ are respectively shown in the following equations, $$\Delta L_i=\frac{S_i}{\rho_0 c_0^2}\Delta l_i$$

$$\Delta C_i=\frac{\rho_0}{S_i}\Delta l_i$$

wherein, $1\le i\le n$;

S123, obtaining the total radiation impedance of the secondary waveguide tube through stepping algorithm, calculating the total impedance $Z_n$ of the n-th section of the waveguide tube and the radiation of the opening.

$$Z_n=\frac{R_{br}}{R_{br}+1+j\omega(\Delta C_{n1}+M_{br}R_{br})}$$

calculating the total impedance $Z_{n-1}$ between the n−1-th section of the waveguide tube and $Z_n$, $$Z_{n-1}=\frac{1}{1+j\omega\Delta C_{n-1}Z_n}+j\omega\Delta L_{n-1}$$

by analogy, the total radiation impedance $Z_{b0}$ of the secondary waveguide tube and radiation opening is $$Z_{b0}=Z_1=\frac{1}{1+j\omega\Delta C_1 Z_2}+j\omega\Delta L_1$$

At the same time, the radiation impedance $Z_i$ of the opening and the cross-sectional area $S_i$ at the junction of the main waveguide tube and the secondary waveguide tube can be calculated.

In step S13, the radiation impedance $Z_1$ of the waveguide tube is:

$$Z_1=R_0+j\omega M_0$$

when the main waveguide tube needs to be used, the radiation impedance $Z_1$ of the waveguide tube is:

$$Z_1=Z_{a0}=R_{a0}+j\omega M_{a0}$$

when the secondary waveguide tube needs to be used, the radiation impedance $Z_1$ of the waveguide tubes is:

$$Z_1=Z_{a0}=R_{a0}+j\omega M_{a0}$$

when both the main waveguide tube and the secondary waveguide tube need to be used, the radiation impedance $Z_1$ of the waveguide tubes is:

$$Z_1=Z_{b0}=R_{b0}+j\omega M_{b0}$$

$R_{a0}$ is the radiation resistance of the main waveguide tube, $M_{a0}$ is the radiation mass of the main waveguide tube, $R_{b0}$ is the radiation resistance of the secondary waveguide tube, and $M_{b0}$ is the radiation mass of the secondary waveguide tube.

In one embodiment, the mathematical model of the woofer device in step S2 is used to describe the woofer and the main and secondary waveguide tubes.

In one embodiment, step S2 specifically comprises:

S21, giving the loop equation of the loudspeaker system circuit as follows:

$$U(t)=R_e i(t)+L_e\frac{di}{dt}+Bl\cdot v(t)$$

wherein, U(t) is the voltage output by the front-end power amplifier of the woofer, $R_e$ is the DC resistance of the voice coil, i(t) is the current in the voice coil, $L_e$ is the inductance of the voice coil, Bl is the electromagnetic induction coefficient, and v(t) is the motion velocity of the voice coil, and t is the time;

S22, giving the vibration loop equation of the loudspeaker system as follows:

$$Bl\cdot i(t)=M_m\ddot{X}(t)+R_m\dot{X}(t)+K_m X(t)$$

wherein, $M_m$ is the mass of the cone and voice coil, $R_m$ is the vibration impedance, $K_m$ is the elastic force coefficient of the elastic components such as the damper, and X(t) is the relationship of the vibration displacement of a vibration system of the woofer with the time;

S23, adding the influence of the radiation impedance of the main and secondary waveguide tubes on the acoustic vibration to the vibration loop equation as the acoustic load of the vibration loop, and rewriting the vibration loop equation as:

$$Bl\cdot i(t)=M_{ms}\ddot{X}(t)+R_{ms}\dot{X}(t)+K_{ms}X(t)$$

wherein, $M_{ms}=M_m+M_0S_D^2$, $R_{ms}=R_m+R_0S_D^2$, $K_{ms}=K_m$, and $S_D$ is the equivalent area of the cone;

S24, considering all the loops of the woofer device, giving the mathematical model shown in the following differential equations, $$\begin{cases}U(t)=R_e i(t)+L_e\frac{di}{dt}+Bl\cdot v(t)\\ Bl\cdot i(t)=M_{ms}\ddot{X}(t)+R_{ms}\dot{X}(t)+K_{ms}X(t)\end{cases}.$$

In one embodiment, in step S3, solving the mathematical model to obtain the sound pressures at different frequency points of the woofer, and calculating the sound pressure levels at different frequency points according to the sound pressures to obtain the sound pressure level curve of the woofer system.

In one embodiment, according to the sound pressure level curve obtained in step S3, comparing whether the curve meets the desired radiated sound field, if not, setting new structural parameters of the main and secondary waveguide tubes, returning to step S1, and re-solving according to step S2 to obtain new sound pressure level curve and comparing with the desired radiated sound field; repeating the cycle until the sound pressure level curve that meets the desired radiated sound field is obtained, and maintaining the corresponding structural parameters of the main and secondary waveguide tubes.

In one embodiment, the structural parameters of the main and secondary waveguide tubes comprise cross-sectional area, variation of curvature, and length.

In one embodiment, when redesigning the structural parameters of the waveguide tubes, only one of the parameters is changed, and the other parameters remain unchanged.

In one embodiment, step S3 specifically comprises:

S31, initializing the differential equations, setting the parameters of the woofer, and substituting the radiation impedance of the main and secondary waveguide tubes obtained in step S1 into the differential equations, S32, solving the differential equations by using the forward Euler method, input and output of the loudspeaker system are shown in the following equation:

$$y=AX$$

wherein, A=[0 1 0], $X^T=[X_1\ X_2\ X_3]=[i(t)\ x(t)\ dx/dt]$; the vector X satisfies the following relation expression $$\dot{X}=FX+GU$$

wherein, $$\dot{X}=[\dot{X}_1\dot{X}_2\dot{X}_3],\ G^T=\left[\frac{1}{L_e}\ \ 0\ \ 0\right],\ F=\begin{bmatrix}-\frac{R_e}{L_e} & 0 & -\frac{B_l}{L_e}\\ 0 & 0 & 1\\ \frac{B_l}{M_m} & -\frac{K_m}{M_m} & -\frac{R_m}{M_m}\end{bmatrix},$$

i(t), x(t), and dx/dt are the variation relationship of current with time, the variation relationship of displacement with time, and the variation relationship of speed with time, $M_m$ are the mass of the cone and the voice coil, $R_m$ is the vibration impedance, and $K_m$ is the elastic force coefficient of the elastic component;

in the discrete time domain, writing the differential form as a first-order forward difference form, and rewriting the above relation expression as $$X(n+1)=(\Delta T\cdot F+1)X(n)+\Delta T\cdot GU$$

wherein, $X(n)^T=[X_1(n)\ X_2(n)\ X_3(n)]$, $X_1(n)$, $X_2(n)$, and $X_3(n)$ are respectively the current of the woofer, the displacement of the cone and the vibration velocity of the cone, 1 is the unit vector, and ΔT is the interval time;

S33, solving the radiated sound pressure of the woofer obtaining the vibration velocity of the diaphragm of the woofer according to step S32, namely $X_3(n)$, and then obtaining the volume velocity $X_3(n)S_d$ of the entire radiating surface of the loudspeaker, denoted as $U_i$;

wherein $S_d$ is the effective radiation area of the loudspeaker, dividing the cavity into a plurality of sections, after passing through the first section of the cavity, the volume velocity $U_1$ is $$U_1=\frac{Z_1-j\omega\Delta L_1}{Z_1}U_0$$

wherein, $\Delta L_1$ is the length of the first section of the cavity, $U_0$ is the volume velocity before passing through the first section of the cavity;

by analogy, gradually calculating volume velocities passing through each section of the cavity until volume velocity $U_i$ at the junction of the main waveguide tube and the secondary waveguide tube $$U_i=\frac{Z_i-j\omega\Delta L_i}{Z_i}U_{i-1}$$

wherein, $U_{i-1}$ is the volume velocity before passing through the cavity;

S34, at the junction of the main waveguide tube and the secondary waveguide tube, satisfying the continuity condition of the sound pressure $$p_i+p_r=p_t=p_b$$

wherein, $p_n$ is the incident radiation sound wave at the junction of the main and secondary waveguide tubes, $p_r$ is the reflected sound wave, $p_t$ is the sound wave in the main waveguide tube, and $p_b$ is the sound wave in the secondary waveguide tube;

further satisfying the following continuity condition of corresponding volume velocity $$U_i+U_r=U_t+U_b$$

wherein, $U_i$ is the incident volume velocity at the junction of the main and secondary waveguide tubes, $U_r$ is the reflected volume velocity, $U_t$ is the volume velocity in the main waveguide tube, and $U_b$ is the sound wave in the secondary waveguide tube;

S35, substituting the particle velocity $v=p/\rho_0c_0$ into the above equation to obtain $$\frac{S_Lp_i}{\rho_0c_0}-\frac{S_Lp_r}{\rho_0c_0}=\frac{Sp_t}{\rho_0c_0}+\frac{p_b}{Z_{b0}}$$

wherein, p is the sound pressure at the particle position, $\rho_0$ is the density of the medium in which the sound wave propagates, $c_0$ is the speed of the sound wave propagating in the air, $S_L$ is the cross-sectional area of the main and secondary waveguide tubes when they are not separated, and S is the cross-sectional area of the main waveguide tube, $Z_{b0}$ is the total radiation impedance of the secondary waveguide tube and the radiation opening;

S36, substituting the continuity condition equation of sound pressure into the above equation to obtain $$\frac{S_L}{\rho_0c_0}\left(\frac{p_{ai}-p_{ar}}{p_{ai}+p_{ar}}\right)=\frac{S_L}{\rho_0c_0}+\frac{1}{Z_{b0}}$$

wherein, $p_{ai}$ is the incident radiation sound pressure at the junction of the main and secondary waveguide tubes, $p_{ar}$ is the reflected sound pressure;

solving the above equation to obtain the sound pressure reflection coefficient $r_p$ $$|r_p|=\left|\frac{p_{ar}}{p_{ai}}\right|=\left|\frac{-\rho_0c_0/2S_L}{-\rho_0c_0/2S_L+Z_{b0}}\right|$$

Similarly, obtaining the transmission coefficient $$|r_p| = \left|\frac{p_{at}}{p_{ai}}\right|,$$

$p_{at}$ is the sound pressure in the main waveguide tube.

Combined with step S2, calculating the volume velocity after passing through the main waveguide tube step by step until the last section, that is, the volume velocity $U_n$ after the nth section of the main waveguide tube is:

$$U_n = \frac{Z_n - j\omega\Delta L_n}{Z_n} U_{n-1}\left(1 - \left|\frac{-\rho_0 c_0 / 2S_L}{-\rho_0 c_0 / 2S_L + Z_{b0}}\right|\right)$$

wherein, $U_n$ is the volume velocity after passing through the nth section of the main waveguide tube, $Z_n$ is the radiation resistance of the opening of the nth section of the main waveguide tube, and $U_{n-1}$ is the volume velocity after passing through the n−1-th section of the main waveguide tube;

finally, calculating the radiated sound pressure p at different frequency points of the entire loudspeaker system $$p = \frac{R_{ar} U_n}{2\pi r}$$

obtaining the sound pressures at different frequency points, and then calculating the sound pressure level to obtain the sound pressure level curve.

A design system of the above-mentioned vehicle-mounted woofer device adopts the above-mentioned design method. The design system comprises:

a waveguide tube radiation impedance design module, for introducing the model of the transmission line theory, using distributed parameters, and discretely calculating the acoustic impedance of the waveguide tube with variable cross-section;

a mathematical model of the loudspeaker system, for establishing a model considering the influence of the radiation impedance of the waveguide tube, the radiation impedance of the waveguide tube affecting the vibration characteristics of the woofer, and also affecting the radiation sound field characteristics of the loudspeaker system;

a solution module of the loudspeaker system, for adopting the time-domain state space model to solve the differential equation of the loudspeaker system, construct the coefficient matrix, introduce the first-order difference equivalent formula, and obtain the progressive solution expression;

an optimization module of the loudspeaker system, for comparing the error between the calculated sound pressure curve and the target curve, and adjusts the structural parameters of the waveguide tube according to the change of the error. In the process of parameter resetting, most of the parameters can be kept unchanged, and only one of the parameters can be changed to become larger or smaller, and if the error becomes larger, the parameters need to be adjusted reversely.

The present disclosure adopts the above solutions, and has the following advantages over the prior art:

In the woofer device of the present disclosure, a main waveguide tube and a secondary waveguide tube are used, and when the cone moves downward, the air is compressed to generate sound waves, the sound waves enter the cavity, and are compressed again, and then pass through the main waveguide tube and the secondary waveguide tube to radiate outward, improving the sensitivity of the loudspeaker device, making the low frequency expansion more obvious, and improving the sound pressure level at low frequencies.

In the design method of the present disclosure, the design of the waveguide tube is introduced into the dual-channel ventilated vehicle-mounted woofer system, compared with the traditional Helmholtz resonator-based design scheme, it has a higher design freedom, and can adjust and control more parameters; an analytical calculation method of waveguide tube radiation impedance based on transmission line theory is proposed, which can be applied to various waveguide tubes with variable cross-sections, and has good guiding significance for practical engineering operations; a small-signal parameter mathematical model of the loudspeaker system considering the radiation impedance of the waveguide tube is provided, which can calculate the influence of the radiation impedance of the waveguide tube on the vibration characteristics of the woofer; the present disclosure provides a method for iteratively calculating the radiated sound field of a waveguide tube by using a state space equation, which is beneficial to engineering calculation and has practical value; an optimal design method of the dual-channel ventilated vehicle-mounted woofer device is provided, which adjusts the structural parameters of the main and secondary waveguide tubes through the magnitude change of the error combining with the latest error iteration criterion, which has practical engineering significance and is very beneficial to practical operation.

BRIEF DESCRIPTION

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

FIG. 1*a* is a schematic three-dimensional diagram of a woofer device according to an embodiment of the present disclosure;

FIG. 1*b* is a schematic three-dimensional diagram of the woofer device shown in FIG. 1*a* from another view;

Figure 9:
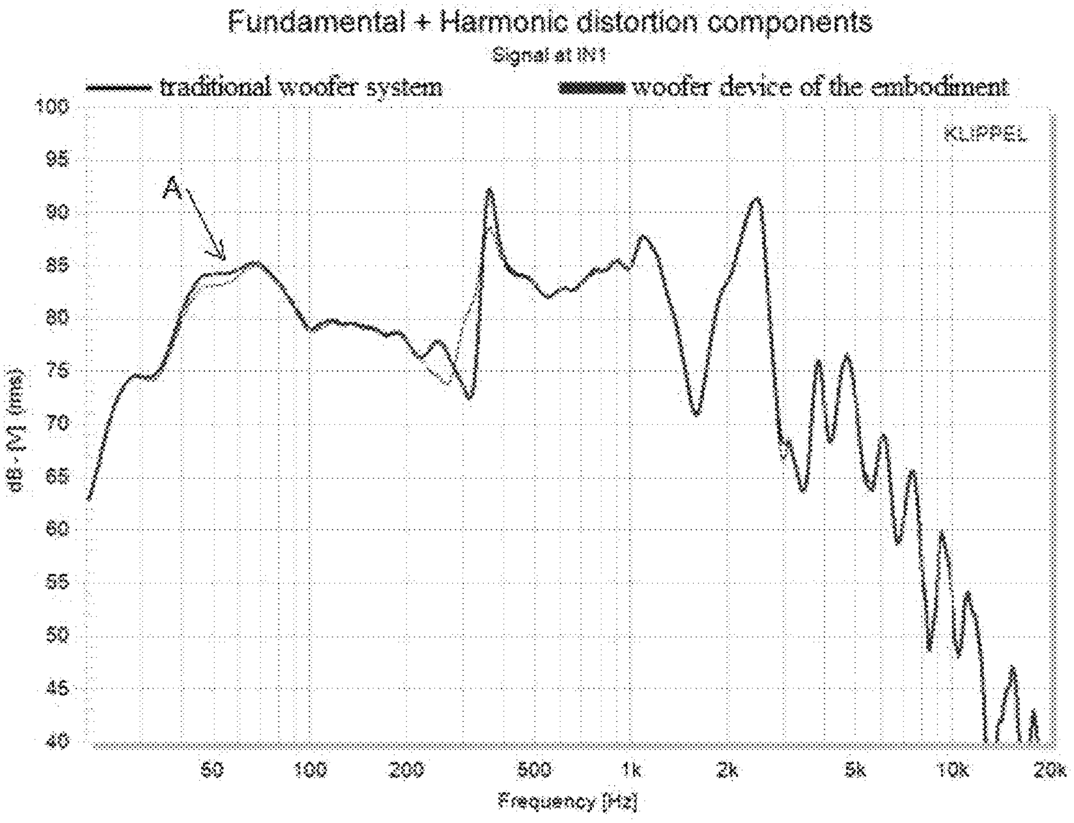

FIGS. 8*a* to 8*d* respectively show schematic diagrams of several waveguide tubes according to embodiments of the present disclosure;

FIG. 9 is a comparison diagram of frequency response curves of a single-waveguide tube woofer device and a woofer device of the present embodiment.

REFERENCE NUMBERS

1—box body; 10—rear cover; 100—outlet pipe portion; 11—first partition plate; 12—second partition plate; 13—third partition plate; 131—gap; 14—fourth partition plate; 141—gap;
2—woofer, 20—cone; 21—frame; 210—through hole; 22—magnetic circuit system; 23—brace; 230—through hole; 24—voice coil; 25—damper;
3—cavity; 31—main waveguide tube; 311—inlet; 312—outlet; 32—secondary waveguide tube; 321—inlet; 322—outlet.

DETAILED DESCRIPTION

In the following, the preferred embodiments of the present disclosure are explained in detail combining with the accompanying drawings so that the advantages and features of the present disclosure can be easily understood by the skilled persons in the art.

Figure 1A:
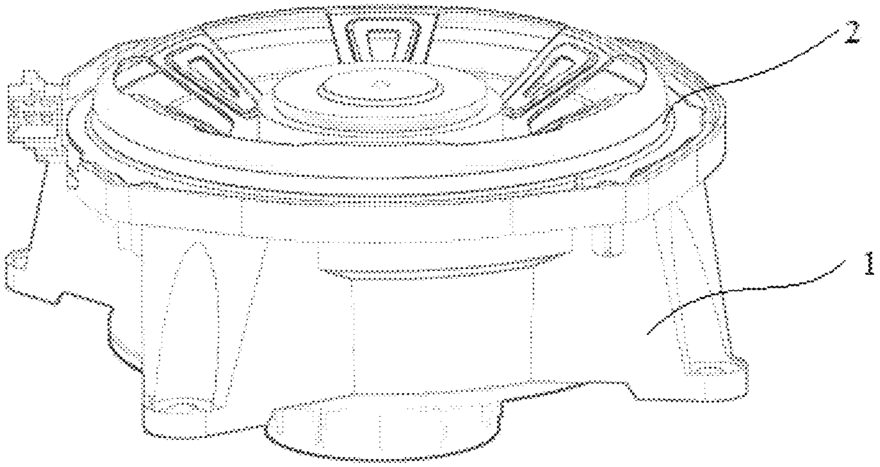
Figure 1B:
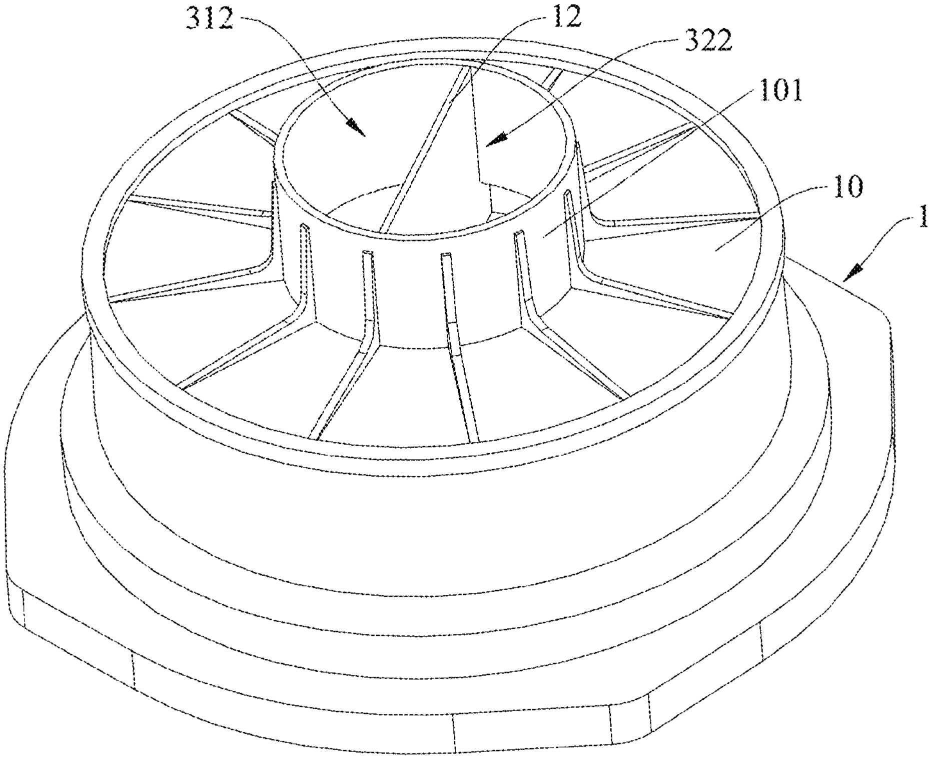
Figure 2:
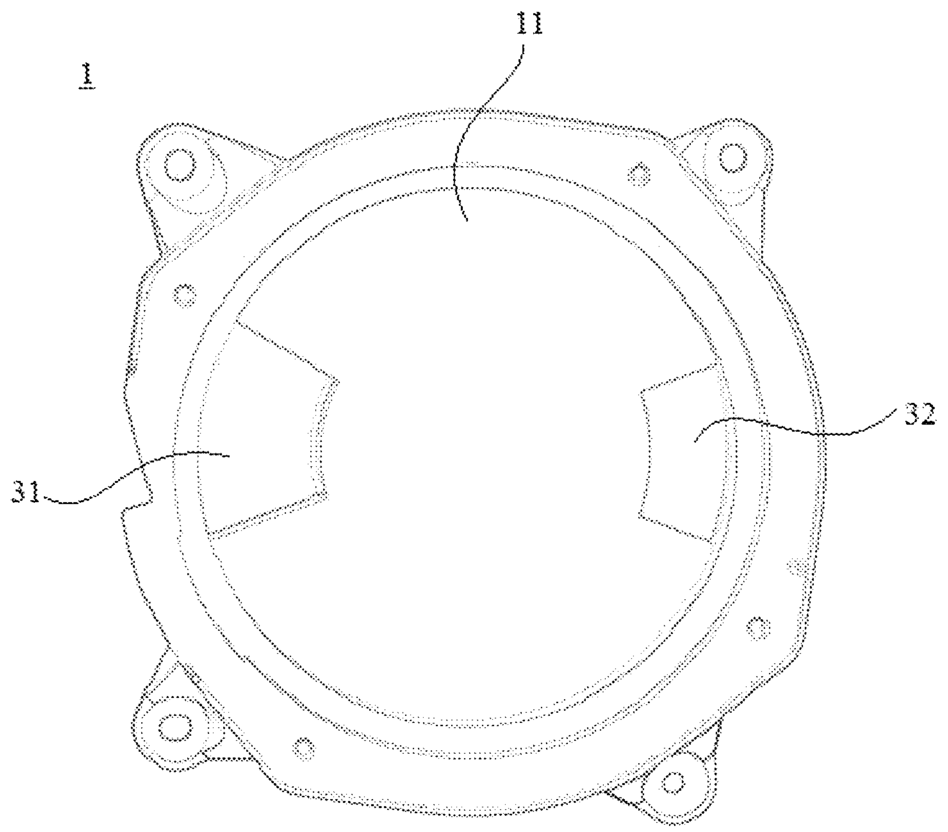
FIG. 2 is a schematic front view of a box body according to an embodiment of the present disclosure.
Figure 3:
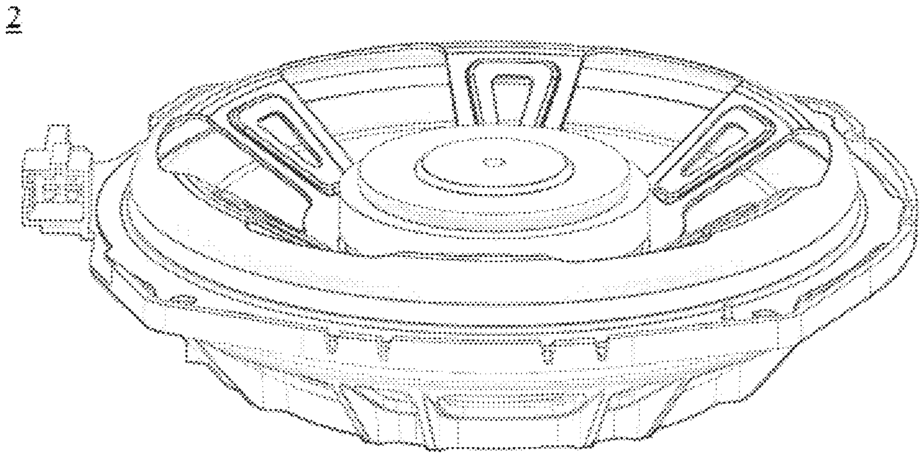
FIG. 3 is a schematic three-dimensional diagram of a woofer according to an embodiment of the present disclosure.
Figure 4:
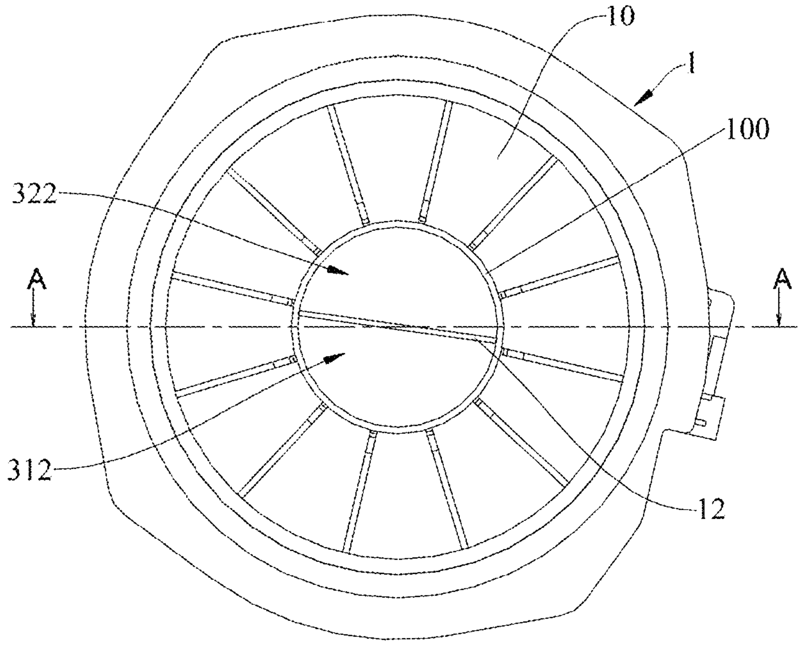
FIG. 4 is a schematic rear view of the woofer device shown in FIG. 1.

This embodiment provides a dual-waveguide tube vehicle-mounted woofer device. Referring to FIG. 1*a*, FIG. 2 and FIG. 3, the vehicle-mounted woofer device mainly comprises two parts, namely a box body 1 and a woofer 2, and the woofer 2 is arranged in the box body 1. Referring to FIG. 1*a* to FIG. 8*d*, the woofer 2 comprises a cone 20, the cone 20 has a front surface facing the interior of an automobile compartment and a rear surface opposite to the front surface, and the forward sound waves of the woofer 2 are spread to the free space inside the automobile compartment. The cone in this embodiment specifically adopts a paper cone, and PP or the like can also be selected. A cavity 3 is formed between the rear surface of the cone 20 and the box body 1, a main waveguide tube 31 for communicating the cavity 3 with the outside is disposed in the box body 1, a secondary waveguide tube 32 is further disposed in the box body 1, the main waveguide tube 31 is provided with an inlet 311 in communication with the cavity 3, the secondary waveguide tube 32 is provided with an inlet 321 in communication with the cavity 3, the main waveguide tube 31 is further provided with an outlet 312 for communicating with the outside of the automobile compartment, and the secondary waveguide tube 32 is further provided with an outlet 322 for communicating with the outside or inside of the automobile compartment. Specifically, in this embodiment, the outlets 312 and 322 of the first waveguide tube 31 and the secondary waveguide tube 32 are both connected to the outside of the automobile compartment. The forward radiated sound field of the woofer 2 and the sound field radiated by the two waveguide tubes are separated by a baffle, and the baffle can be a sealing sheet metal between the trunk and the automobile compartment of the vehicle, or a sealing sheet metal between the bottom plate and the automobile compartment, and the sheet metal is provided with through holes as radiation holes of the two waveguide tubes.

Figure 5:
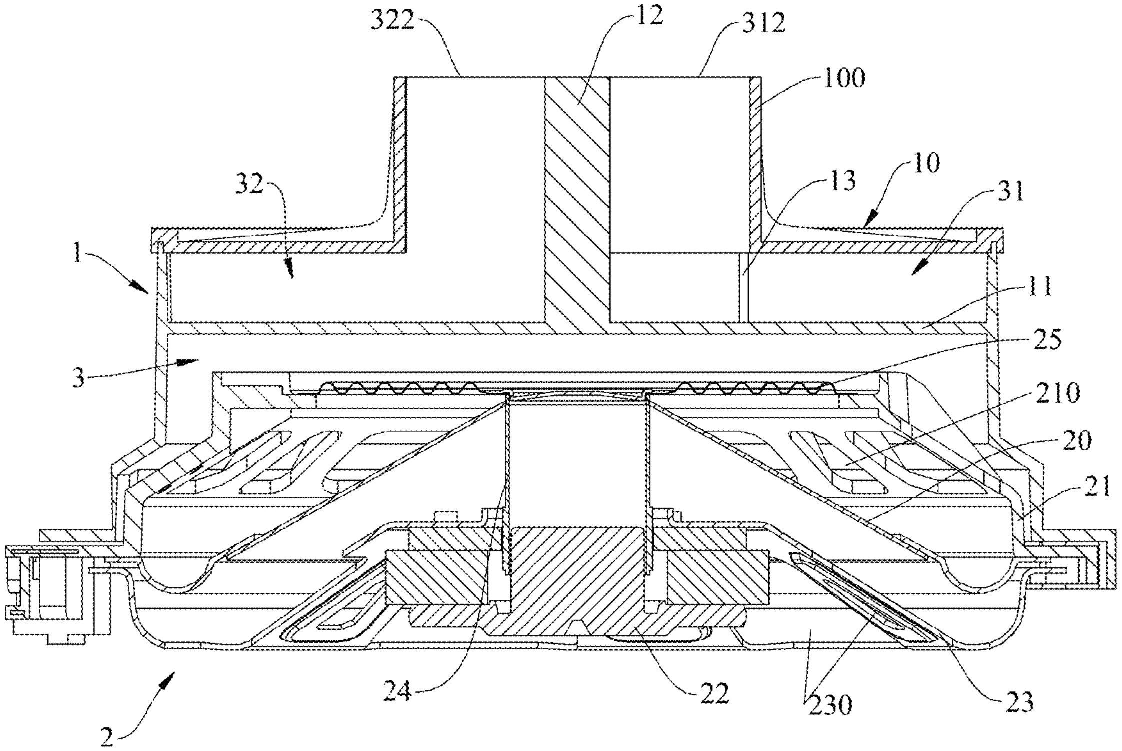
FIG. 5 is a section view along A-A in FIG. 4.

As shown in FIG. 5, the cone 20 is fixed on the frame 21. The front end (specifically, the lower end in FIG. 5) of the box body 1 is open, and the outer periphery of the frame 21 is fixedly connected to the front end of the box body 1. The rear end (specifically, the upper end in FIG. 5) of the box body 1 is provided with a rear cover 10, and the outlet 312 of the main waveguide tube 31 and the outlet 322 of the secondary waveguide tube 32 are respectively arranged on the rear cover 10. Specifically, a rearward extending outlet pipe portion 100 is formed in the middle of the rear cover 10, and the outlet pipe portion 100 forms the above-mentioned two outlets 312 and 322. The outlet pipe portion 100 can pass through the above-mentioned sheet metal part to communicate with the outside of the cabin. The orientation words "front" and "rear" mentioned herein are defined for convenience of description, and correspond to the lower side and the upper side of the paper in FIG. 5, respectively.

Referring to FIGS. 2 and 5-7, a first partition plate 11 is fixedly arranged in the box body 1, and the first partition plate 11 is located between the woofer 2 and the rear cover 10 so as to form the cavity 3 on the front side of the first partition plate 11. The main waveguide tube 31 and the secondary waveguide tube 32 are formed between the first partition plate 11 and the back cover 10, and the inlets 311 and 321 of the waveguide tubes are respectively opened on the first partition plate 11. In this embodiment, the first partition plate 11 is arranged horizontally, and its outer periphery is fixedly connected to the side wall of the box body 1, or the two are integrally formed.

Figure 6:
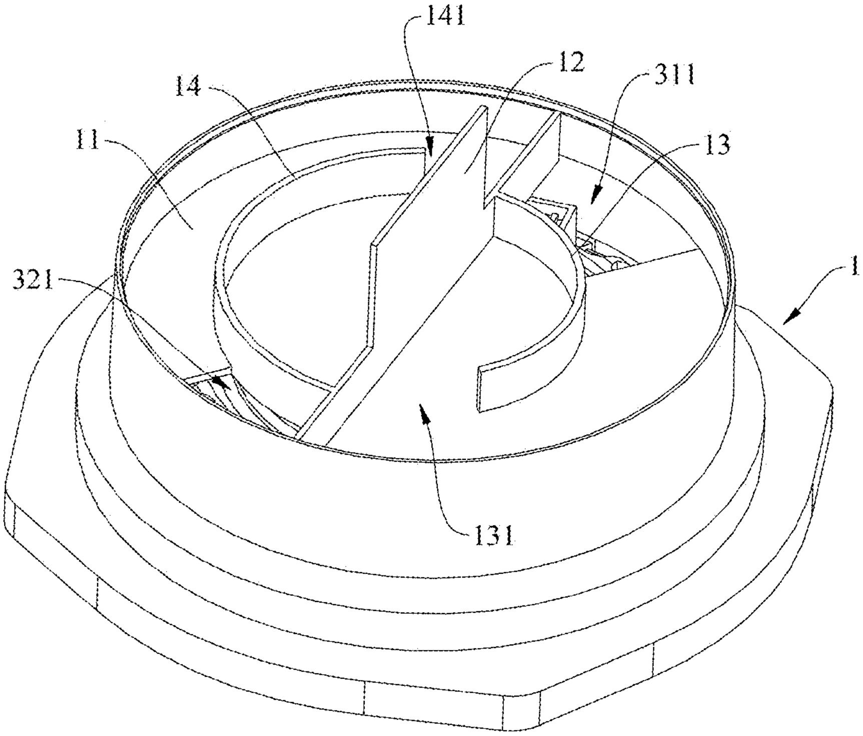
FIG. 6 is a schematic three-dimensional diagram of a woofer according to an embodiment of the present disclosure, wherein the rear cover is not shown.
Figure 7:
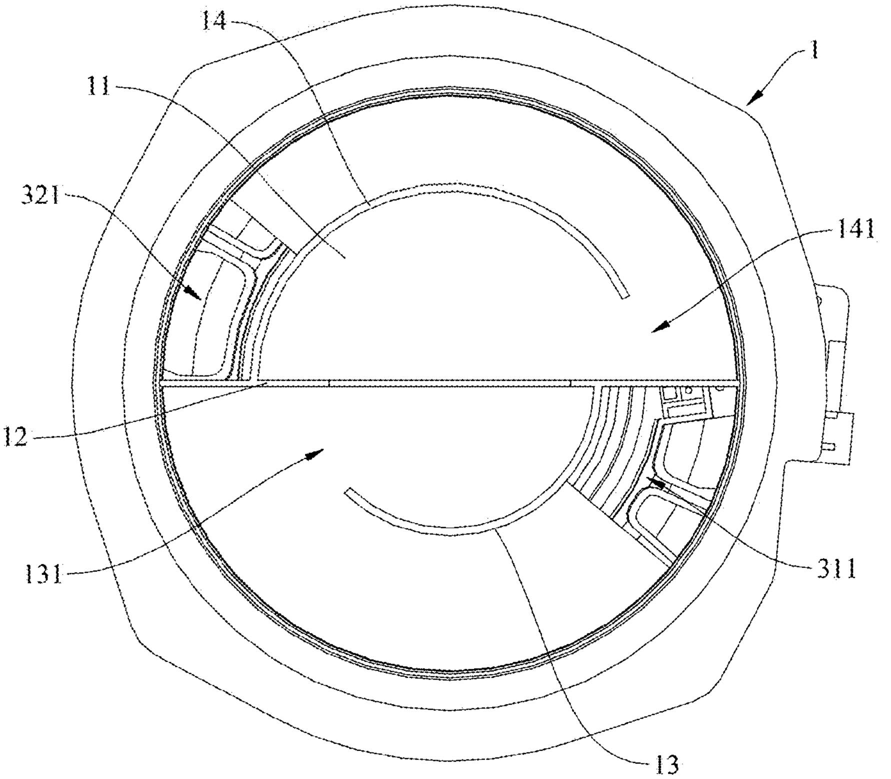
FIG. 7 is the schematic rear view of the woofer device shown in FIG. 6.

A second partition plate 12, a third partition plate 13, and a fourth partition plate 14 are further arranged in the box body 1. The second partition plate 12 divides the space between the first partition plate 11 and the rear cover 10 into a first space portion and a second space portion, the third partition plate 13 divides the first space portion to form the main waveguide tube 31, and the fourth partition plate 14 divides the second space portion to form the secondary waveguide tube 32. Specifically as shown in FIG. 6 and FIG. 7, both the third partition plate 13 and the fourth partition plate 14 are curved plate which are in arc shape, and the two arc shapes share the same center of circle, and the radius of the third partition plate 13 is smaller than that of the fourth partition plate 14. The head end of the third partition plate 13 and the head end of the fourth partition plate 14 are respectively connected to the second partition plate 12, and gaps 131, 141 that are in communication with the corresponding outlets 312, 322 of the waveguide tubes are respectively formed between the tail end of the third partition plate 13 and the second partition plate 12 and between the tail end of the fourth partition plate 14 and the second partition plate 12, wherein the head end of the fourth partition plate 14 is adjacent to the tail end of the third partition plate 13. The inlet 311 of the main waveguide tube 31 is adjacent to the head end of the third partition plate 13, and the inlet 321 of the secondary waveguide tube 32 is adjacent to the head end of the fourth partition plate 14.

The second partition plate 12 is generally vertically disposed, and further divides the outlet pipe portion 100 of the rear cover 10 into two parts, which respectively form the outlet 312 of the main waveguide tube 31 and the outlet 322 of the secondary waveguide tube 32. Accordingly, the shape of the second partition plate 12 is irregular, specifically, the width of the rear portion thereof is reduced with respect to the width of the front portion thereof to match the inner diameter of the outlet pipe portion 100. It should also be noted that the joints between the partition plates 11, 12, 13 and 14 and the joints where they contact the box body 1 need to be sealed to avoid tiny gaps for air flow to pass through.

In this embodiment, the areas of the inlet 311 and the outlet 312 of the main waveguide tube 31 are respectively larger than the areas of the inlet 321 and the outlet 322 of the secondary waveguide tube 32, and the cross-sectional area of the middle part of the main waveguide tube 31 is larger than the cross-sectional area of the middle part of the secondary waveguide tube 32, and the two are respectively smaller than the areas of the respective inlets 311, 321 and outlets 312, 322, so that the cross-section areas of the main waveguide tube 31 and the secondary waveguide tube 32 perpendicular to the airflow direction first decrease and then increase.

As shown in FIG. 5, the frame 21 is a hollowed-out frame 21, and a plurality of through holes for air circulation is opened on the frame 21. The magnetic circuit system 22 of the woofer 2 is mounted on the front side of the cone 20, the rear end of the voice coil 24 of the woofer 2 is connected to the cone 20, and the front end of the voice coil 24 is inserted into the magnetic gap formed in the magnetic circuit system 22. The magnetic circuit system 22 is mounted on the frame 21 through a brace 23, and the brace 23 is provided with a through hole 230 for air to pass through. The woofer 2 further comprises a damper 25, the damper 25 is fixedly arranged at the rear end portion of the voice coil 24, the damper 25 is located on the rear side of the cone 20, and the outer periphery of the damper 25 is fixedly connected to the frame 21.

Figure 8A:
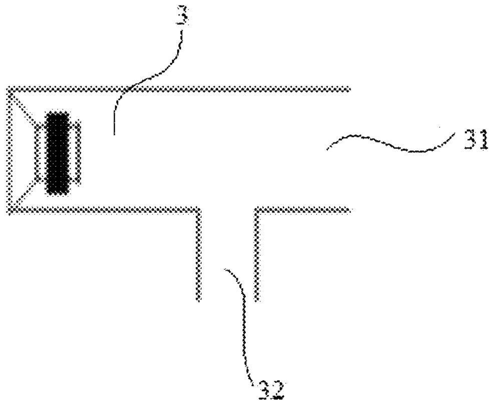
Figure 8B:
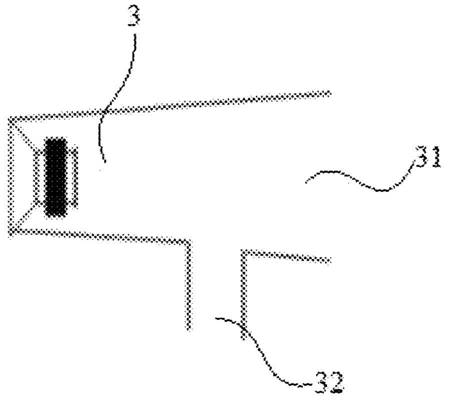
Figure 8C:
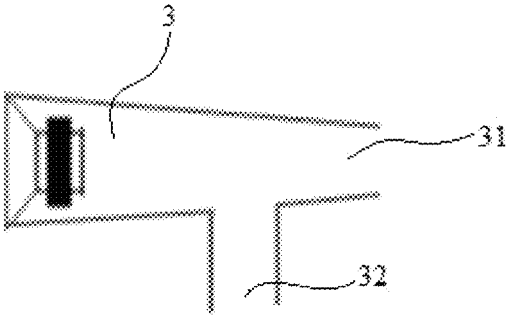
Figure 8D:
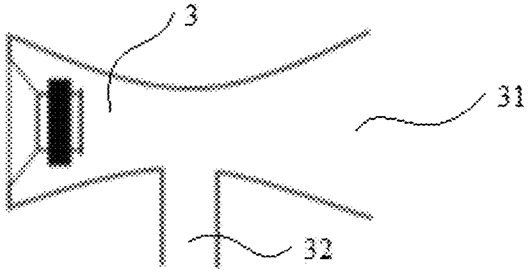

As shown in FIG. 8*a*, the cross-sectional areas of the main waveguide tube 31 and the secondary waveguide tube 32 may be constant. As shown in FIG. 8*b*, the cross-sectional areas of the main waveguide tube 31 and the secondary waveguide tube 32 may gradually increase along the airflow direction. As shown in FIG. 8*c*, the cross-sectional areas of the main waveguide tube 31 and the secondary waveguide tube 32 may gradually decrease along the airflow direction. As shown in FIG. 8*d*, the cross-sectional areas of the main waveguide tube 31 and the secondary waveguide tube 32 may first decrease and then increase, and this embodiment adopts the main waveguide tube 31 and the secondary waveguide tube 32 of this type.

In the woofer device, the woofer 2 is flipped into the box body 1, which reduces the volume of the entire loudspeaker device and makes the structure relatively compact. The main waveguide tube 31 and the secondary waveguide tube 32 are not straight channels, but are like "spiral" channels. When the cone 20 moves downward, the air is compressed to generate sound waves, the sound waves enter the cavity 3, and are compressed again, and then pass through the main waveguide tube 31 and the secondary waveguide tube 32 to radiate outward, improving the sensitivity of the loudspeaker device.

This embodiment further comprises a design example. First, the small signal parameters of the woofer used are as follows: $R_e$=2.02 ohm, inductance $L_e$=0.288 mH, resonance frequency $f_s$=50.4 Hz, vibration mass $M_{ms}$=50.258 g, damping $R_{ms}$=1.347 kg/s, elastic coefficient of the vibration system $K_{ms}$=5.05 N/mm, electromagnetic driving force coefficient Bl=2.826 N/A. Next, for the four waveguide tube designs as shown in FIGS. 8*a* to 8*d*, set the length and cross-sectional area variation characteristics of the main waveguide tube and the secondary waveguide tube, and calculate the acoustic impedance of the main waveguide tube and the secondary waveguide tube. Then, according to the calculated acoustic impedance, the following mathematical model of the woofer device is obtained:

$$\begin{cases} U(t) = R_e i(t) + L_e \dfrac{di}{dt} + Bl \cdot v(t) \\ Bl \cdot i(t) = M_{ms}\ddot{X}(T) + R_{ms}\dot{X}(t) + K_{ms}X(t) \end{cases}$$

Solve the differential equations, calculate the radiated sound field of the loudspeaker device, compare the obtained radiated sound field with the desired radiated sound field, compare and calculate the error between the obtained sound pressure level curve and the target curve, and adjust the structural parameters of the main and secondary waveguide tubes according to the change of the error.

The performance test was carried out on a single-waveguide tube woofer device and the woofer device in this embodiment. The signal parameters of the woofers used by the two are as follows: DC resistance $R_e$=2.02 ohm, inductance $L_e$=0.288 mH, resonance frequency $f_s$=50.4 Hz, vibration mass $M_{ms}$=50.258 g, damping $R_{ms}$=1.347 kg/s, elastic coefficient of the vibration system $K_{ms}$=5.05 N/mm, electromagnetic driving force coefficient Bl=2.826 N/A. The performance test was carried out in a semi-anechoic chamber, the woofer devices were installed on a baffle, and the opening of the baffle was the same as the diameter of the loudspeaker radiation outlet. A B&K microphone 4189 was placed 1 m away from the loudspeaker to collect the output signal of the loudspeaker device. The loudspeakers and microphones were at the same level. In addition, the experiment also selected a power amplifier, a R&D measurement system of Klippel Company.

The test results are shown in FIG. 9, the thin line in the figure represents the frequency response curve of the traditional single-channel Helmholtz resonator loudspeaker device; the thick line in the figure represents the frequency response curve of the dual-waveguide tube type woofer device of this embodiment. It can be seen from the figure that the low frequency extension of the woofer device of this embodiment is more obvious, as shown in Part A in FIG. 9, the sound pressure level of the woofer device of this embodiment at low frequencies is higher.

The embodiments described above are only for illustrating the technical concepts and features of the present disclosure, and are intended to make those skilled in the art being able to understand the present disclosure and thereby implement it, and should not be concluded to limit the protective scope of this disclosure.

What is claimed is:

1. A vehicle-mounted woofer device, comprising a box body and a woofer disposed in the box body, wherein the woofer comprises a cone, the cone has a front surface facing interior of an automobile compartment and a rear surface opposite to the front surface, a cavity is formed between the rear surface of the cone and the box body, a main waveguide tube for communicating the cavity with the outside is disposed in the box body, a secondary waveguide tube is further disposed in the box body, the main waveguide tube and the secondary waveguide tube are each provided with an inlet in communication with the cavity, the main waveguide tube is provided with an outlet for communicating with the outside of the automobile compartment, and the secondary waveguide tube is provided with an outlet for communicating with the outside or inside of the automobile compartment.

2. The vehicle-mounted woofer device according to claim 1, wherein the cone is arranged on a frame, the frame is connected to a front end of the box body, a rear cover is arranged on a rear end of the box body, and the respective outlets are arranged on the rear cover.

3. The vehicle-mounted woofer device according to claim 2, wherein a first partition plate is arranged in the box body, and the first partition plate is located between the woofer and the rear cover to form the cavity on the front side of the first baffle, the main waveguide tube and the secondary waveguide tube are formed between the first partition plate and the rear cover, and the respective inlets are opened on the first partition plate.

4. The vehicle-mounted woofer device according to claim 3, wherein a second partition plate, a third partition plate and a fourth partition plate are further arranged in the box body, and the second partition plate divides a space between the first partition plate and the rear cover into a first space portion and a second space portion, the third partition plate divides the first space portion to form the main waveguide tube, and the fourth partition plate divides the second space portion to form the secondary waveguide tube.

5. The vehicle-mounted woofer device according to claim 4, wherein both the third partition plate and the fourth partition plate are curved plate in arc shape, and the two arc shapes share a same center of circle, and radius of the third partition plate is smaller than that of the fourth partition plate.

6. The vehicle-mounted woofer device according to claim 5, wherein a head end of the third partition plate and a head end of the fourth partition plate are respectively connected to the second partition plate, and gaps that are in communication with corresponding outlets of the waveguide tubes are respectively formed between a tail end of the third partition plate and the second partition plate and between a tail end of the fourth partition plate and the second partition plate.

7. The vehicle-mounted woofer device according to claim 6, wherein the head end of the fourth partition plate is adjacent to the tail end of the third partition plate.

8. The vehicle-mounted woofer device according to claim 6, wherein the inlet of the main waveguide tube is adjacent to the head end of the third partition plate, and the inlet of the secondary waveguide tube is adjacent to the head end of the fourth partition plate.

9. The vehicle-mounted woofer device according to claim 4, wherein an outlet pipe portion extending rearward is formed in a middle portion of the rear cover, and the outlet pipe portion is divided by the second partition plate to form the outlet of the main waveguide tube and the outlet of the secondary waveguide tube.

10. The vehicle-mounted woofer device according to claim 3, wherein a second partition plate and a third partition plate are further arranged in the box body, the second partition plate divides a space between the first partition plate and the rear cover into a first space portion and a second space portion, and the third partition plate divides the first space portion to form the main waveguide tube or divides the second space portion to form the secondary waveguide tube.

11. The vehicle-mounted woofer device according to claim 1, wherein cross-section areas of the main waveguide tube and the secondary waveguide tube perpendicular to an airflow direction first decrease and then increase.

12. The vehicle-mounted woofer device according to claim 1, wherein a magnetic circuit system of the woofer is mounted on front side of the cone, a rear end of the voice coil of the woofer is connected to the cone, and a front end of the voice coil is inserted into a magnetic gap formed in the magnetic circuit system.

13. The vehicle-mounted woofer device according to claim 12, wherein the magnetic circuit system is mounted on the frame through a brace, and the brace is provided with a through hole for air to pass through.

14. The vehicle-mounted woofer device according to claim 12, wherein the woofer further comprises a damper, the damper is fixedly arranged at the rear end portion of the voice coil, the damper is located on rear side of the cone, an outer periphery of the damper is mounted on the frame, and the frame is provided with a through hole for the air to pass through.

15. The vehicle-mounted woofer device according to claim 1, wherein the cone is a paper cone.

16. A design method for the vehicle-mounted woofer device according to claim 1, wherein the design method comprises the following steps:

S1, selecting a main waveguide tube and a secondary waveguide tube, and calculating the total radiation impedance of the selected main waveguide tube and the secondary waveguide tube;

S2, building a woofer device model according to the radiation impedances of the main waveguide tube and the secondary waveguide tube obtained in step S1, and the model is shown in the following differential equations, $$\begin{cases} U(t) = R_e i(t) + L_e \frac{di}{dt} + Bl \cdot v(t) \\ Bl \cdot i(t) = M_{ms}\ddot{X}(T) + R_{ms}\dot{X}(t) + K_{ms}X(t) \end{cases}$$

wherein, U(t) is voltage output by a front-end power amplifier of the woofer, $R_e$ is DC resistance of a voice coil of the woofer, i(t) is current in the voice coil, $L_e$ is inductance of the voice coil, Bl is electromagnetic induction coefficient, and v(t) is motion velocity of the voice coil, $M_{ms}$ is vibration mass of a vibration system of the woofer, $R_{ms}$ is vibration resistance of the vibration system, $K_{ms}$ is stiffness coefficient of the vibration system, $\ddot{X}(t)$ is a relationship of vibration acceleration of the vibration system with time, $\dot{X}(t)$ is a relationship of vibration velocity of the vibration system with time, X(t) is a relationship of vibration displacement of the vibration system with time, and t is time;

S3, calculating a radiated sound field of the woofer device according to the model built in step S2;

S4, comparing the radiated sound field obtained in step S3 with a desired radiated sound field, if the desired radiated sound field is met, determining that the main waveguide tube and the secondary waveguide tube meet the design requirements; if the desired radiated sound field is not met, adjusting configurations of the main waveguide tube and the secondary waveguide tube.

17. The design method according to claim 16, in step S1, calculating the total radiation impedance according to the following equation:

$$Z_1=R_{b0}+j\omega M_{b0}+R_{a0}+j\omega M_{a0}$$

in the equation, $R_{a0}$ is radiation resistance of the main waveguide tube, $M_{a0}$ is radiation mass of the main waveguide tube, $R_{b0}$ is radiation resistance of the secondary waveguide tube, and $M_{b0}$ is radiation mass of the secondary waveguide tube, j is imaginary unit, ω is angular frequency;

the step S3 specifically comprises:

S3-1, initializing the differential equations, setting parameters of the woofer, and substituting the total radiation impedance $Z_1$ obtained in step S1 into the differential equations;

S3-2, solving the differential equations by using forward Euler method, input and output of the woofer are shown in the following equation, $$y=AX$$

wherein, A=[0 1 0], $X^T=[X_1\ X_2\ X_3]=[i(t)x(t)\ dx/dt]$; the vector X satisfies the following relation expression $\dot{X}=FX+GU$ wherein, $$\dot{X}=[\dot{X}_1\ \dot{X}_2\ \dot{X}_3],\ G^T=\left[\frac{1}{L_e}00\right],\ F=\begin{bmatrix}-\frac{R_e}{L_e} & 0 & -\frac{Bl}{L_e}\\ 0 & 0 & 1\\ \frac{Bl}{M_m} & -\frac{K_m}{M_m} & -\frac{R_m}{M_m}\end{bmatrix},$$

i(t), x(t), and dx/dt are a variation relationship of current with time, a variation relationship of displacement with time, and a variation relationship of speed with time, $M_m$ are mass of the cone and the voice coil, $R_m$ is vibration impedance, and $K_m$ is elastic force coefficient of elastic component;

in discrete time domain, rewriting the above relation expression as a first-order forward difference form $X(n+1)=(\Delta T\cdot F+1)X(n)+\Delta T\cdot GU$, wherein, $X(n)^T=[X_1(n)X_2(n)X_3(n)]$, $X_1(n)$, $X_2(n)$, and $X_3(n)$ are respectively current of the woofer, displacement of the cone and vibration velocity of the cone, 1 is unit vector, and $\Delta T$ is interval time;

S3-3, solving radiated sound pressure of the woofer, obtaining volume velocity $X_3(n)S_d$ of the entire radiating surface of the woofer according to the vibration velocity $X_3(n)$ of the cone of the woofer, denoted as $U_i$, wherein $S_d$ is effective radiation area of the woofer, dividing the cavity into a plurality of sections, after passing through the first section of the cavity, volume velocity $U_1$ is $$U_1=\frac{Z_1-j\omega\Delta L_1}{Z_1}U_0$$

wherein, $\Delta L_1$ is length of the first section of the cavity, $U_0$ is volume velocity before passing through the first section of the cavity;

by analogy, gradually calculating volume velocities passing through each section of the cavity until volume velocity $U_i$ at a junction of the main waveguide tube and the secondary waveguide tube $$U_i=\frac{Z_i-j\omega\Delta L_i}{Z_i}U_{i-1}$$

wherein, $U_{i-1}$ is volume velocity before passing through i section of the cavity;

S3-4, at the junction of the main waveguide tube and the secondary waveguide tube, satisfying the following continuity condition of sound pressure $$p_i+p_r=p_t=p_b$$

wherein, $p_i$ is incident radiation sound pressure at the junction of the main and secondary waveguide tubes, $p_r$ is reflected sound pressure, $p_t$ is sound pressure in the main waveguide tube, and $p_b$ is sound pressure in the secondary waveguide tube;

further satisfying the following continuity condition of corresponding volume velocity $$U_i+U_r=U_t+U_b$$

wherein, $U_i$ is incident volume velocity at the junction of the main and secondary waveguide tubes, $U_r$ is reflected volume velocity, $U_t$ is volume velocity in the main waveguide tube, and $U_b$ is volume velocity in the secondary waveguide tube;

S3-5, substituting particle velocity $v=p/\rho_0c_0$ into the above equation to obtain $$\frac{S_Lp_i}{\rho_0c_0}-\frac{S_Lp_r}{\rho_0c_0}=\frac{Sp_t}{\rho_0c_0}+\frac{p_b}{Z_{b0}}$$

wherein, p is sound pressure at particle position, $\rho_0$ is density of medium in which the sound wave propagates, $c_0$ is speed of the sound wave propagating in the air, $S_L$ is cross-sectional area of the main and secondary waveguide tubes when they are not separated, and S is cross-sectional area of the main waveguide tube, $Z_{b0}$ is the total radiation impedance of the secondary waveguide tube and the radiation opening;

S3-6, substituting the continuity condition equation of sound pressure into the above equation to obtain $$\frac{S_L}{\rho_0c_0}\left(\frac{p_{ai}-p_{ar}}{p_{ai}+p_{ar}}\right)=\frac{S_L}{\rho_0c_0}+\frac{1}{Z_{b0}}$$

wherein, $p_{ai}$ is incident radiation sound pressure at the junction of the main and secondary waveguide tubes, $p_{ar}$ is reflected sound pressure;

solving the above equation to obtain sound pressure reflection coefficient $r_p$ $$|r_p|=\left|\frac{p_{ar}}{p_{ai}}\right|=\left|\frac{-\rho_0c_0/2S_L}{-\rho_0c_0/2S_L+Z_{b0}}\right|$$

similarly, obtaining transmission coefficient $$|r_p|=\left|\frac{p_{at}}{p_{ai}}\right|,$$

$p_{at}$ is sound in the main waveguide tube;

calculating volume velocity after passing through the main waveguide tube step by step until the last section, that is, the volume velocity $U_n$ after the nth section of the main waveguide tube is:

$$U_n=\frac{Z_n-j\omega\Delta L_n}{Z_n}U_{n-1}\left(1-\left|\frac{-\rho_0c_0/2S_L}{-\rho_0c_0/2S_L+Z_{b0}}\right|\right)$$

wherein, $U_n$ is the volume velocity after passing through the nth section of the main waveguide tube, $Z_n$ is radiation resistance of opening of the nth section of the main waveguide tube, and $U_{n-1}$ is the volume velocity after passing through the n−1-th section of the main waveguide tube;

finally, calculating radiated sound pressure p at different frequency points of the entire woofer device $$p=\frac{R_{ar}U_n}{2\pi r}$$

obtaining sound pressures at different frequency points, and then calculating the sound pressure level to obtain a sound pressure level curve.

* * * * *